(12) United States Patent
Yamaguchi

(10) Patent No.: US 10,557,975 B2
(45) Date of Patent: Feb. 11, 2020

(54) REFLECTING MIRROR AND MIRROR HOLDING MECHANISM

(71) Applicant: NITTOH INC., Suwa-shi, Nagano (JP)

(72) Inventor: Takashi Yamaguchi, Suwa (JP)

(73) Assignee: Nittoh Inc. (JP)

( * ) Notice: Subject to any disclaimer, the term of this patent is extended or adjusted under 35 U.S.C. 154(b) by 0 days.

(21) Appl. No.: 15/758,245

(22) PCT Filed: Jun. 28, 2016

(86) PCT No.: PCT/JP2016/069064
§ 371 (c)(1),
(2) Date: Mar. 7, 2018

(87) PCT Pub. No.: WO2017/047195
PCT Pub. Date: Mar. 23, 2017

(65) Prior Publication Data
US 2018/0259689 A1 Sep. 13, 2018

(30) Foreign Application Priority Data

Sep. 18, 2015 (JP) .................................. 2015-184632

(51) Int. Cl.
G02B 5/10 (2006.01)
G02B 7/182 (2006.01)
G03B 21/28 (2006.01)

(52) U.S. Cl.
CPC ............... *G02B 5/10* (2013.01); *G02B 7/182* (2013.01); *G03B 21/28* (2013.01)

(58) Field of Classification Search
None
See application file for complete search history.

(56) References Cited

U.S. PATENT DOCUMENTS 5,369,456 A * 11/1994 Yokota ................... G03B 13/12
396/378
5,923,482 A * 7/1999 Gilby ........................ G01J 3/18
356/328

(Continued)

FOREIGN PATENT DOCUMENTS

JP H10-144602 A 5/1998
JP H10-253872 A 9/1998

(Continued)

OTHER PUBLICATIONS

Extended European Search Report for Patent Application No. EP 16846068.1 dated Jan. 23, 2019 (7 pages).

*Primary Examiner* — Derek S. Chapel
(74) *Attorney, Agent, or Firm* — Harness, Dickey & Pierce, P.L.C.

(57) ABSTRACT

In a reflection mirror having a concave curved reflection surface, when a surface of the reflection mirror on the side where the reflection surface is formed is a front surface, a surface thereof opposite to the front surface is a rear surface, a direction parallel to an optical axis of the reflection mirror is a first direction, and a direction from the front surface toward the rear surface which is oriented to one side in the first direction is a second direction, the rear surface of the reflection mirror has a flat surface orthogonal to the first direction and a wall surface that rises from at least a part of a region around the flat surface toward the second direction.

7 Claims, 10 Drawing Sheets

(56) References Cited

U.S. PATENT DOCUMENTS

| | | | |
|---|---|---|---|
| 6,043,863 A | 3/2000 | Ikeda | |
| 7,210,796 B2 * | 5/2007 | Iinuma | G03B 21/22 |
| | | | 353/119 |
| 7,329,014 B2 * | 2/2008 | Balogh | B82Y 10/00 |
| | | | 359/845 |
| 8,192,032 B2 * | 6/2012 | Takahashi | H04N 5/74 |
| | | | 353/98 |
| 2009/0211569 A1 * | 8/2009 | Garcia-Conde Noriega | |
| | | | G02B 5/10 |
| | | | 126/694 |
| 2011/0194035 A1 * | 8/2011 | Aizawa | G02B 17/08 |
| | | | 348/744 |
| 2013/0003205 A1 * | 1/2013 | Proudfoot | G02B 7/181 |
| | | | 359/853 |
| 2014/0043705 A1 * | 2/2014 | Lehmann | G02B 26/0816 |
| | | | 359/849 |
| 2015/0055112 A1 * | 2/2015 | Schaffer | G03F 7/702 |
| | | | 355/67 |
| 2017/0326705 A1 * | 11/2017 | Hirata | B24B 13/04 |
| 2018/0059526 A1 | 3/2018 | Takehana et al. | |

FOREIGN PATENT DOCUMENTS

| | | |
|---|---|---|
| JP | 2014-145894 A | 8/2014 |
| JP | 2015-007724 A | 1/2015 |
| WO | WO-2014-020112 A1 | 2/2014 |

\* cited by examiner

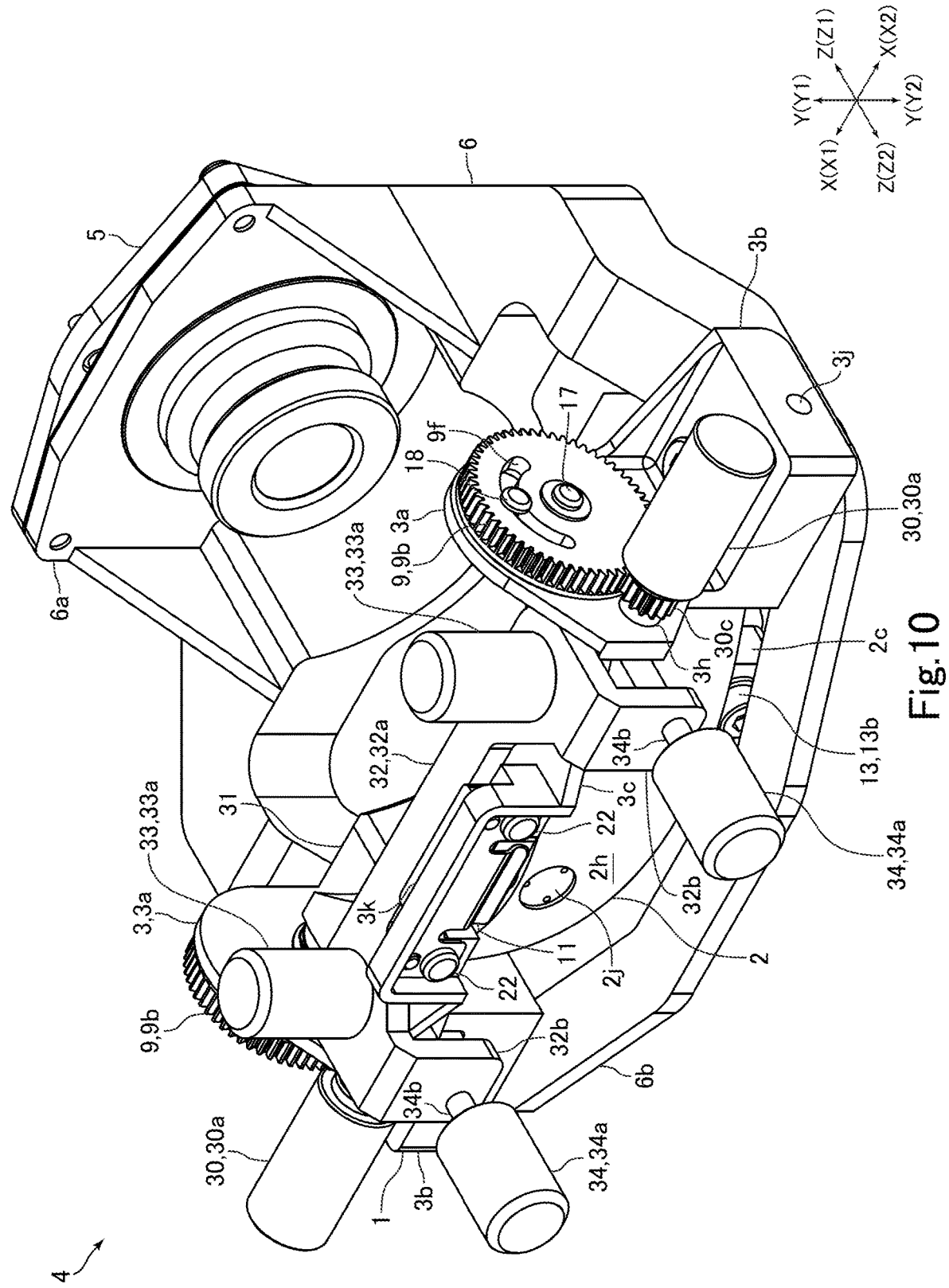

REFLECTING MIRROR AND MIRROR HOLDING MECHANISM

BACKGROUND

Technical Field

The present invention relates to a reflection mirror having a concave reflection surface. The present invention also relates to a mirror holding mechanism including the reflection mirror.

Related Art

A projection optical system including a lens barrel and a reflection mirror on which a reflection surface for reflecting image light transmitted through a lens in the lens barrel is formed has been known (see, for example, JP 2014-145894). The projection optical system described in JP 2014-145894 includes a mirror holding member configured to hold the reflection mirror and a fixation member configured to hold the mirror holding member and fixed to the lens barrel. On the rear surface of the reflection surface of the reflection mirror, a flat surface for adjusting a relative position of the lens barrel and the reflection mirror is formed. In the projection optical system described in JP 2014-145894, a collimator is used to adjust the relative position between the lens barrel and the reflection mirror. The collimator includes a stage, a light source unit disposed above the stage, and an adjustment unit for adjusting the position and angle between the stage and the light source unit.

In the projection optical system described in JP 2014-145894, when the relative position between the lens barrel and the reflection mirror is to be adjusted, for example, first, the lens barrel is placed on the stage such that a reference surface of the lens barrel and the top surface of the stage are substantially parallel to each other. After that, the fixation member is mounted to the lens barrel, and the mirror holding member that is holding the reflection mirror is mounted to the fixation member. After that, the flat surface formed on the rear surface of the reflection mirror is irradiated with light emitted from the light source unit. While checking light reflected by the flat surface, the angle of the reflection mirror with respect to the mirror holding member is adjusted such that the reference surface of the lens barrel and the flat surface are substantially parallel to each other.

In the projection optical system described in JP 2014-145894, if the flat surface formed on the rear surface of the reflection mirror has low surface accuracy (flatness), it is difficult to appropriately adjust the relative position between the lens barrel and the reflection mirror while checking light reflected by the flat surface. In the projection optical system, if the flat surface formed on the rear surface of the reflection mirror has low reflectivity, it is difficult to appropriately adjust the relative position between the lens barrel and the reflection mirror while checking light reflected by the flat surface. Thus, in the projection optical system described in JP 2014-145894, the reflection mirror needs to be manufactured such that the flat surface formed on the rear surface of the reflection mirror has high surface accuracy and the flat surface has high reflectivity, and hence the manufacturing cost of the reflection mirror is increased.

It is therefore an object of the present invention to provide a reflection mirror such that manufacturing cost of the reflection mirror can be reduced while a relative position between a lens barrel and the reflection mirror can be appropriately adjusted in a projection optical system in which the reflection mirror is mounted. It is another object of the present invention to provide a mirror holding mechanism including the reflection mirror.

SUMMARY

In order to solve the above-mentioned problems, a reflection mirror according to the present invention has a concave curved reflection surface, in which when a surface on which the reflection surface is formed is a front surface, a surface opposite to the front surface is a rear surface, a direction parallel to an optical axis of the reflection mirror is a first direction, and a direction from the front surface toward the rear surface which is oriented to one side in the first direction is a second direction, the rear surface has a flat surface orthogonal to the first direction and a wall surface that rises from at least a part of a region around the flat surface toward the second direction.

In the reflection mirror according to the present invention, the rear surface, which is the surface opposite to the front surface on which the reflection surface is formed, has the flat surface orthogonal to the first direction and the wall surface that rises from at least a part of the region around the flat surface toward the second direction. Thus, in the case of adjusting a relative position between a lens barrel and the reflection mirror in a projection optical system in which the reflection mirror of the present invention is mounted, even when an adjustment mirror formed into a flat plate is disposed on the flat surface of the reflection mirror, a deviation of the adjustment mirror disposed on the flat surface can be prevented by the wall surface to dispose the adjustment mirror at a given position. Consequently, in the projection optical system, the relative position between the lens barrel and the reflection mirror can be appropriately adjusted while checking light reflected by the adjustment mirror. Specifically, in the projection optical system, the relative position between the lens barrel and the reflection mirror can be appropriately adjusted without using light reflected by the flat surface of the reflection mirror. Consequently, in the present invention, the relative position between the lens barrel and the reflection mirror can be appropriately adjusted without the need of manufacturing the reflection mirror such that the surface accuracy of the flat surface of the reflection mirror is high and the reflectivity of the flat surface is high. As a result, in the present invention, the manufacturing cost of the reflection mirror can be reduced while the relative position between the lens barrel and the reflection mirror can be appropriately adjusted.

In the present invention, it is preferred that the wall surface rise from an entire circumference of the flat surface toward the second direction so as to surround the entire circumference of the flat surface. Such a configuration can reliably prevent a deviation of the adjustment mirror disposed on the flat surface. Such a configuration enables the flat surface and the wall surface to be formed on the rear surface of the reflection mirror by forming a recessed portion that is recessed toward the front surface on the rear surface of the reflection mirror, and hence the flat surface and the wall surface can be easily formed. In this case, it is preferred that the flat surface be formed on the optical axis of the reflection mirror. Such a configuration enables the recessed portion to be more easily formed on the rear surface of the reflection mirror as compared with the case where the flat surface is formed at a position shifted from the optical axis of the reflection mirror.

In the present invention, it is preferred that the flat surface has three or more protruding portions that protrude in the second direction. With such a configuration, the adjustment mirror is placed on three or more protruding portions, and hence the adjustment mirror can be disposed on the flat surface of the reflection mirror such that the reflection surface of the adjustment mirror is orthogonal to the first direction. In other words, the adjustment mirror can be precisely disposed on the flat surface of the reflection mirror.

In the present invention, it is preferred that when viewed from the first direction, the three or more protruding portions be disposed so as to surround a center of the flat surface. In this case, it is preferred that when viewed from the first direction, the three protruding portions be disposed at equiangular pitches about a center of the flat surface. Such a configuration enables the adjustment mirror to be supported at three points with good balance, thus enabling the adjustment mirror to be more precisely disposed on the flat surface of the reflection mirror.

The reflection mirror according to the present invention can be used for a mirror holding mechanism including a mirror holding member configured to hold the reflection mirror. In a projection optical system in which the mirror holding mechanism is mounted, manufacturing cost of the reflection mirror can be reduced while the relative position between the lens barrel and the reflection mirror can be appropriately adjusted.

Advantageous Effects of Invention

As described above, the present invention can reduce manufacturing cost of a reflection mirror while enabling a relative position between a lens barrel and the reflection mirror to be appropriately adjusted in a projection optical system in which the reflection mirror is mounted.

BRIEF DESCRIPTION OF DRAWINGS

FIG. 10 is a perspective view for describing a state in which the reflection mirror is adjusted in the projection optical system illustrated in FIG. 1.

DETAILED DESCRIPTION

Referring to the accompanying drawings, embodiments of the present invention are described below.

Schematic Configuration of Projection Optical System

Figure 1:
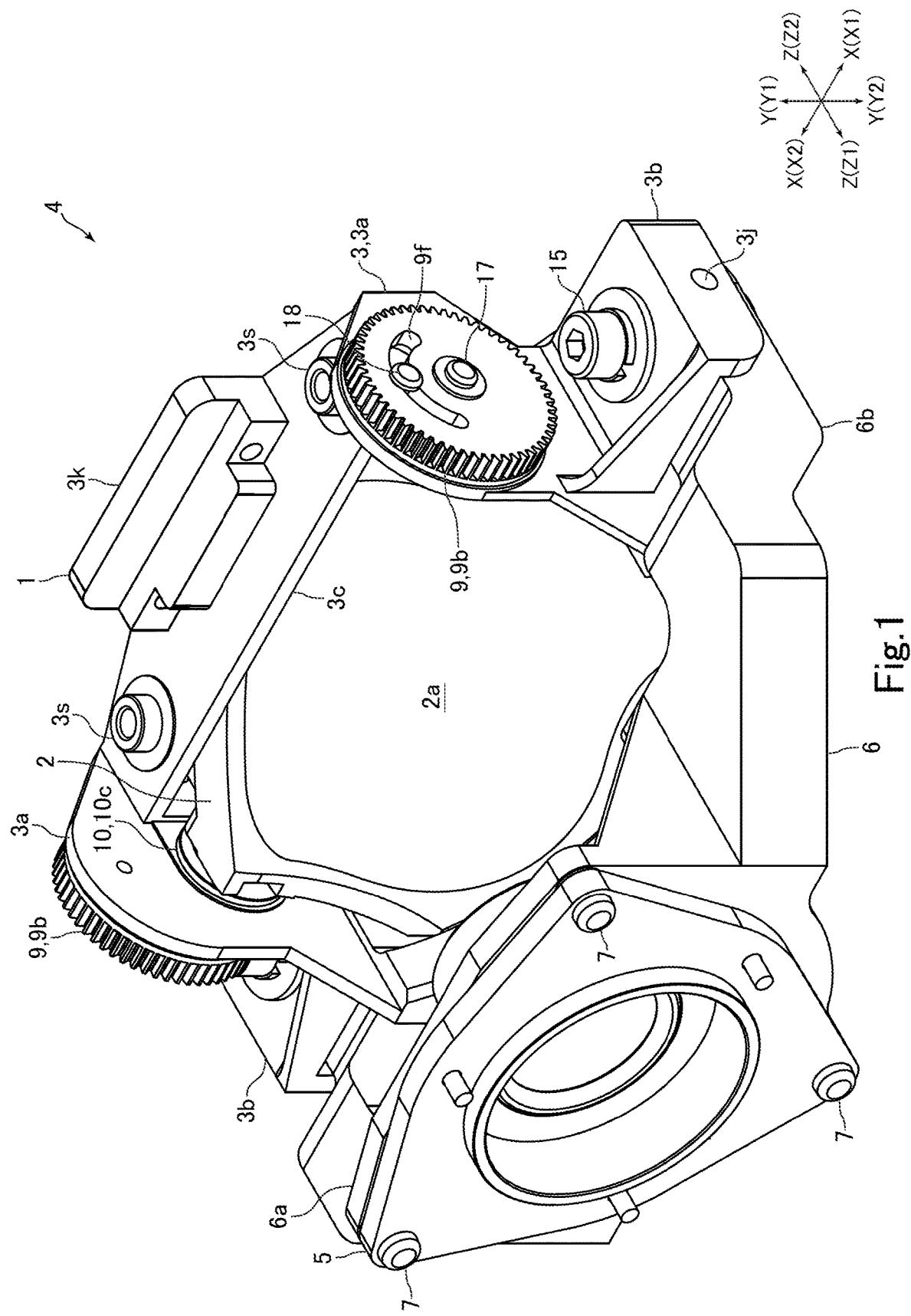
FIG. 1 is a perspective view of a projection optical system in which a reflection mirror according to an embodiment of the present invention is mounted.
Figure 2:
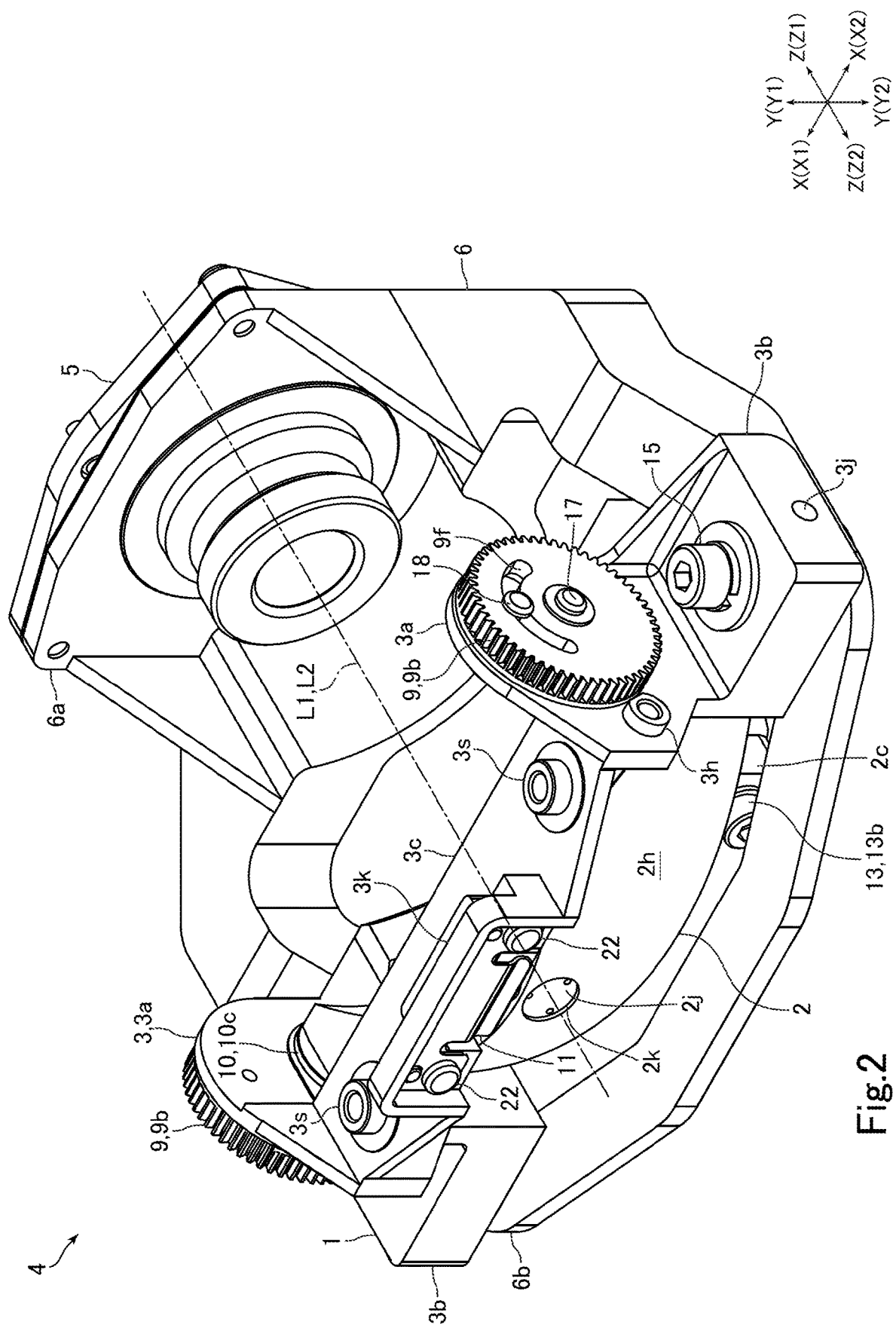
FIG. 2 is a perspective view of the projection optical system illustrated in FIG. 1 from a different angle.

FIG. 1 is a perspective view of a projection optical system 4 in which a reflection mirror 2 according to an embodiment of the present invention is mounted. FIG. 2 is a perspective view of the projection optical system 4 illustrated in FIG. 1 from a different angle.

The reflection mirror 2 in the present embodiment includes a curved reflection surface 2a. The reflection mirror 2 constitutes a part of a mirror holding mechanism 1 including a mirror holding frame 3 serving as a mirror holding member configured to hold the reflection mirror 2. The mirror holding mechanism 1 constitutes a part of the projection optical system 4. The projection optical system 4 enlarges image light from an image adjustment element (not shown) and projects the enlarged image light onto a projection surface such as a screen. The projection optical system 4 includes an imaging optical system, and the imaging optical system is formed of lenses. In the projection optical system 4, image light emitted from an image adjustment element and transmitted through the imaging optical system is reflected by the reflection surface 2a and projected on the projection surface in an enlarged manner. The projection optical system 4 can increase a projection view angle by using the reflection surface 2a. Thus, the projection optical system 4 can project a large projection image onto a projection surface even at a short projection distance.

In the following description, a direction (Z direction in FIG. 1 and other figures) parallel to an optical axis L1 of the reflection mirror 2 is referred to as "front-back direction", an X direction in FIG. 1 and other figures orthogonal to the front-back direction is referred to as "horizontal direction", and a Y direction in FIG. 1 and other figures orthogonal to the front-back direction and the horizontal direction is referred to as "vertical direction". A Z1 direction, which is on one side in the Z direction, is referred to as "front direction". A Z2 direction, which is on the other side in the Z direction, is referred to as "rear (back) direction". An X1 direction, which is on one side in the X direction, is referred to as "right direction". An X2 direction, which is on the other side in the X direction, is referred to as "left direction". A Y1 direction, which is on one side in the Y direction, is referred to as "up direction". A Y2 direction, which is on the other side in the Y direction, is referred to as "down direction". In the present embodiment, the front-back direction (Z direction) is a first direction.

The projection optical system 4 includes a lens barrel 5 in which the lenses of the imaging optical system are disposed on an inner peripheral side thereof, and a fixation frame 6 to which the mirror holding frame 3 is fixed and which is fixed to the lens barrel 5. Each of the lenses is held by a lens frame. The lens frame is disposed on the inner peripheral side of the lens barrel 5 so as to be movable in the front-back direction. In FIG. 1 and FIG. 2, only a part of the lens barrel 5 on the rear end side is illustrated.

The lens barrel 5 is disposed such that an optical axis L2 of the imaging optical system is parallel to the front-back direction. The lens barrel 5 is disposed such that the optical axis L2 of the imaging optical system and the optical axis L1 of the reflection mirror 2 are substantially aligned with each other. The image adjustment element is disposed on the front side of the lens barrel 5. Image light emitted from the image adjustment element passes through the imaging optical system to the rear side. The fixation frame 6 is a frame-shaped member configured to hold the mirror holding frame 3. The fixation frame 6 includes a portion to be fixed 6a that is fixed to the lens barrel 5, and a fixation portion 6b to which the mirror holding frame 3 is fixed. The portion to be fixed 6a constitutes a front part of the fixation frame 6, and the fixation portion 6b constitutes a rear part of the fixation frame 6. The portion to be fixed 6a is fixed to a rear end side of the lens barrel 5 with a bolt 7.

Configuration of Mirror Holding Mechanism

Figure 3:
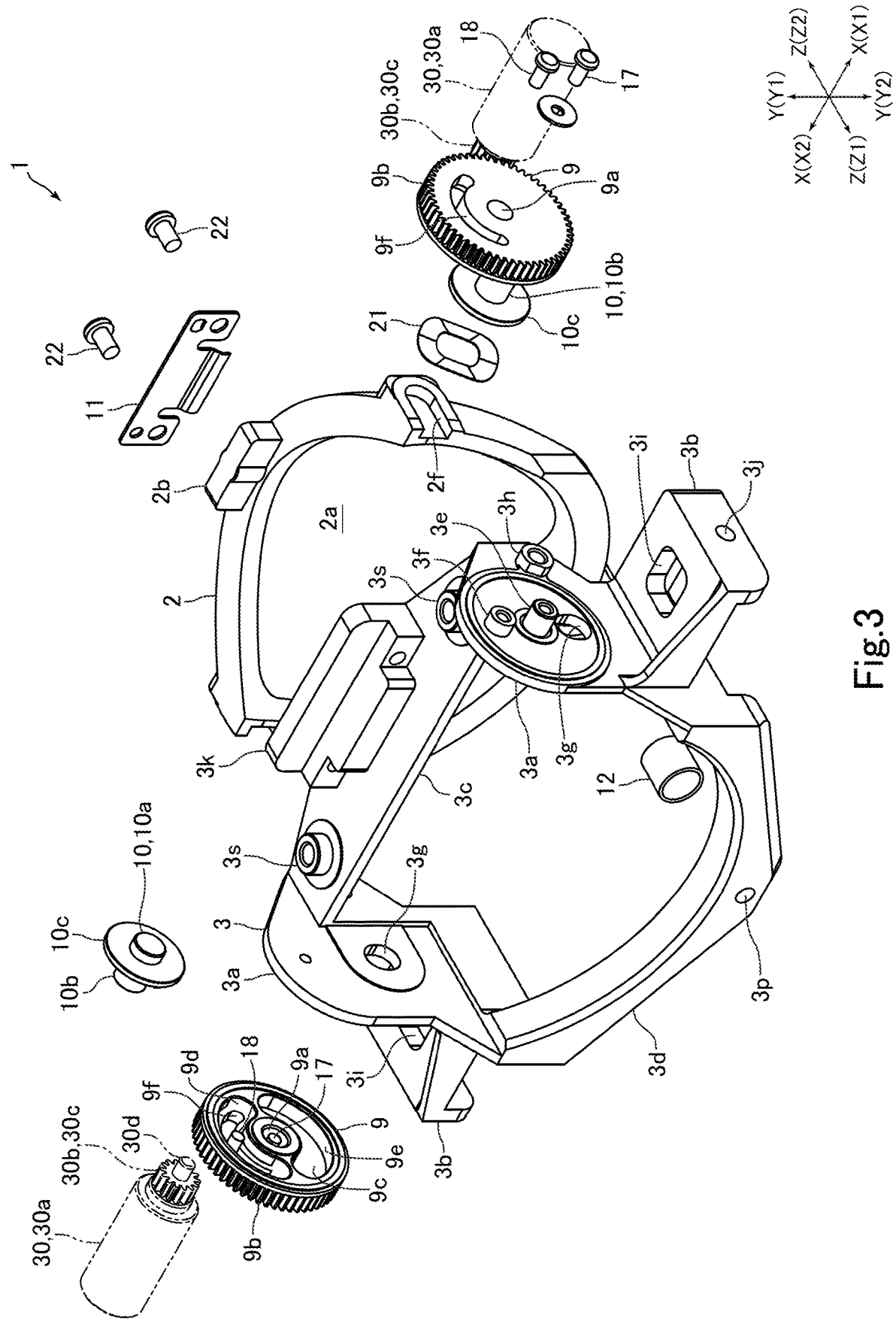
FIG. 3 is an exploded perspective view of a mirror holding mechanism illustrated in FIG. 1.
Figure 4:
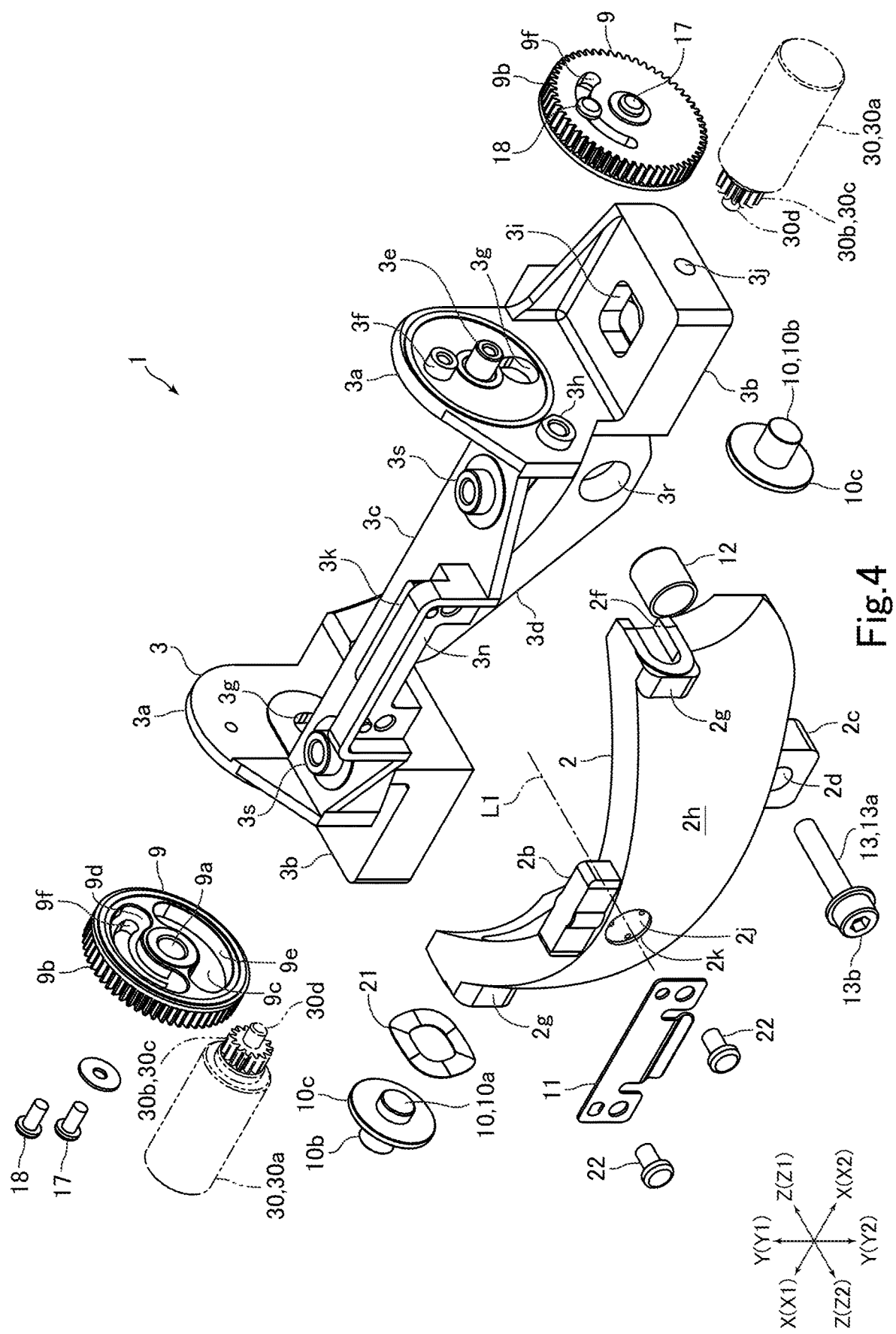
FIG. 4 is an exploded perspective view of the mirror holding mechanism illustrated in FIG. 1 from an angle different from that in FIG. 3.
Figure 5:
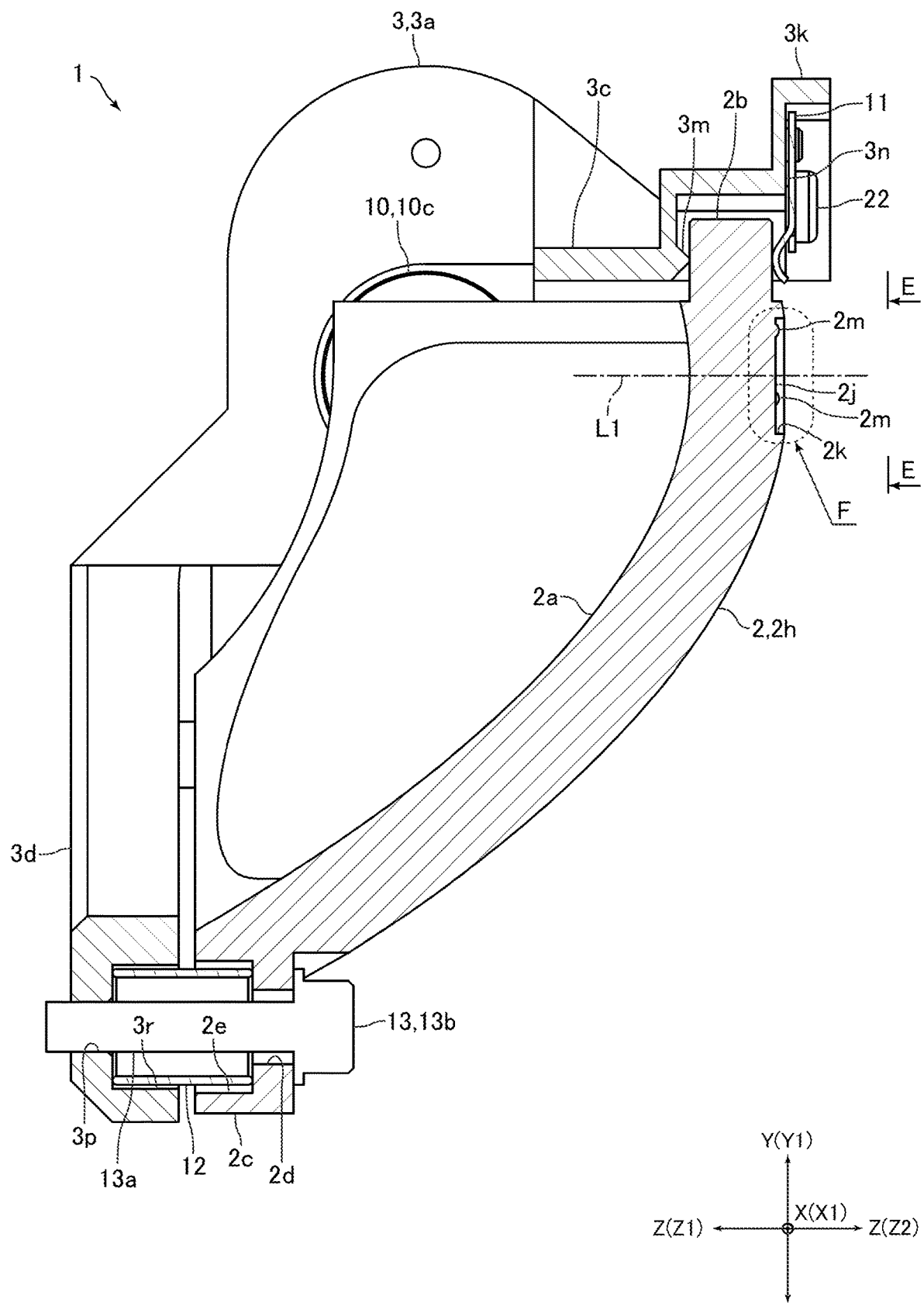
FIG. 5 is a vertical cross-sectional view of the mirror holding mechanism illustrated in FIG. 1.
Figure 6:
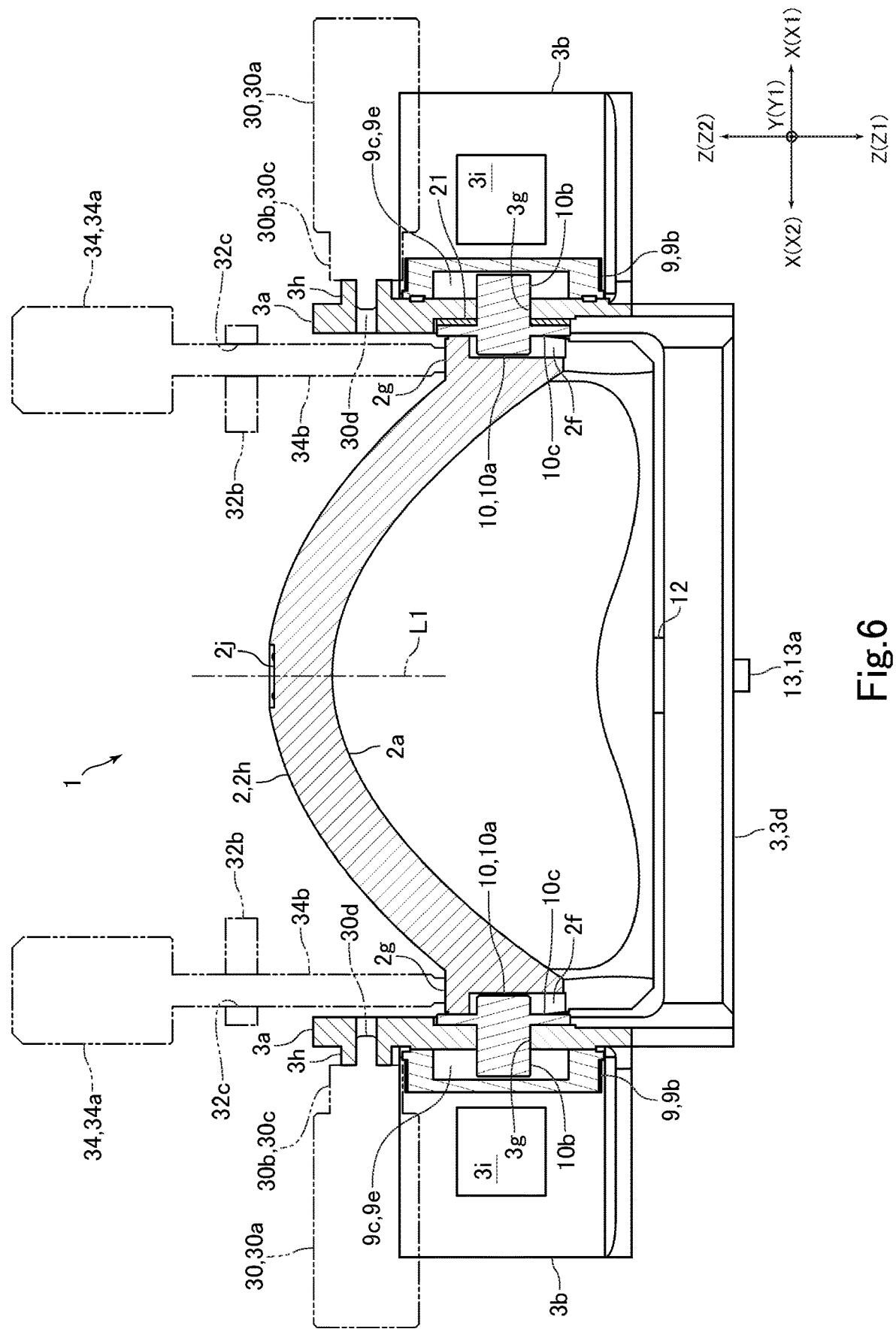
FIG. 6 is a horizontal cross-sectional view of the mirror holding mechanism illustrated in FIG. 1.
Figure 7:
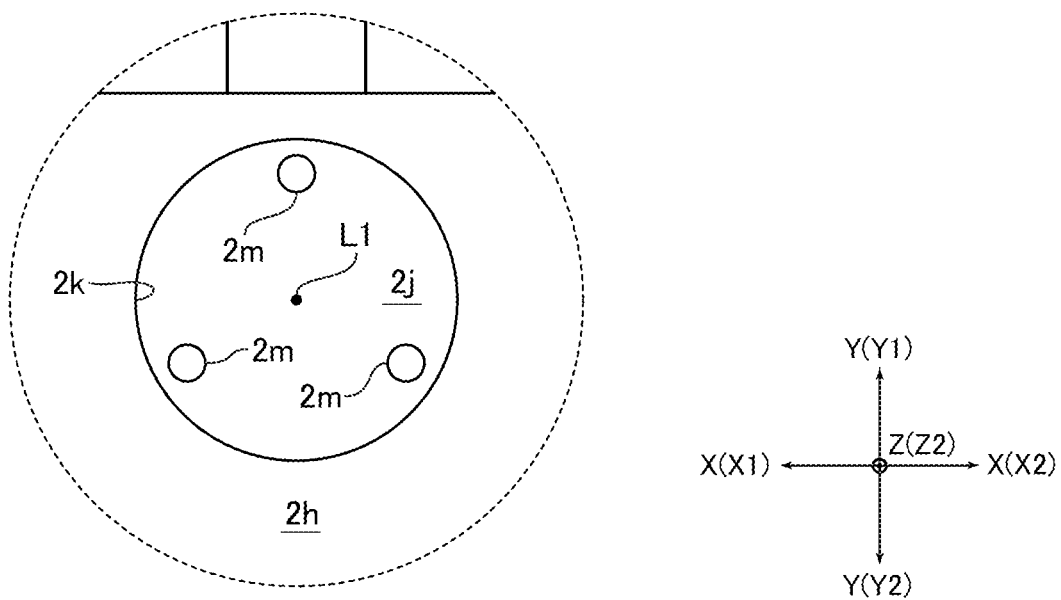
FIG. 7 is an enlarged view illustrating a flat surface of the reflection mirror and its vicinity as seen from the direction E-E in FIG. 5.
Figure 8:
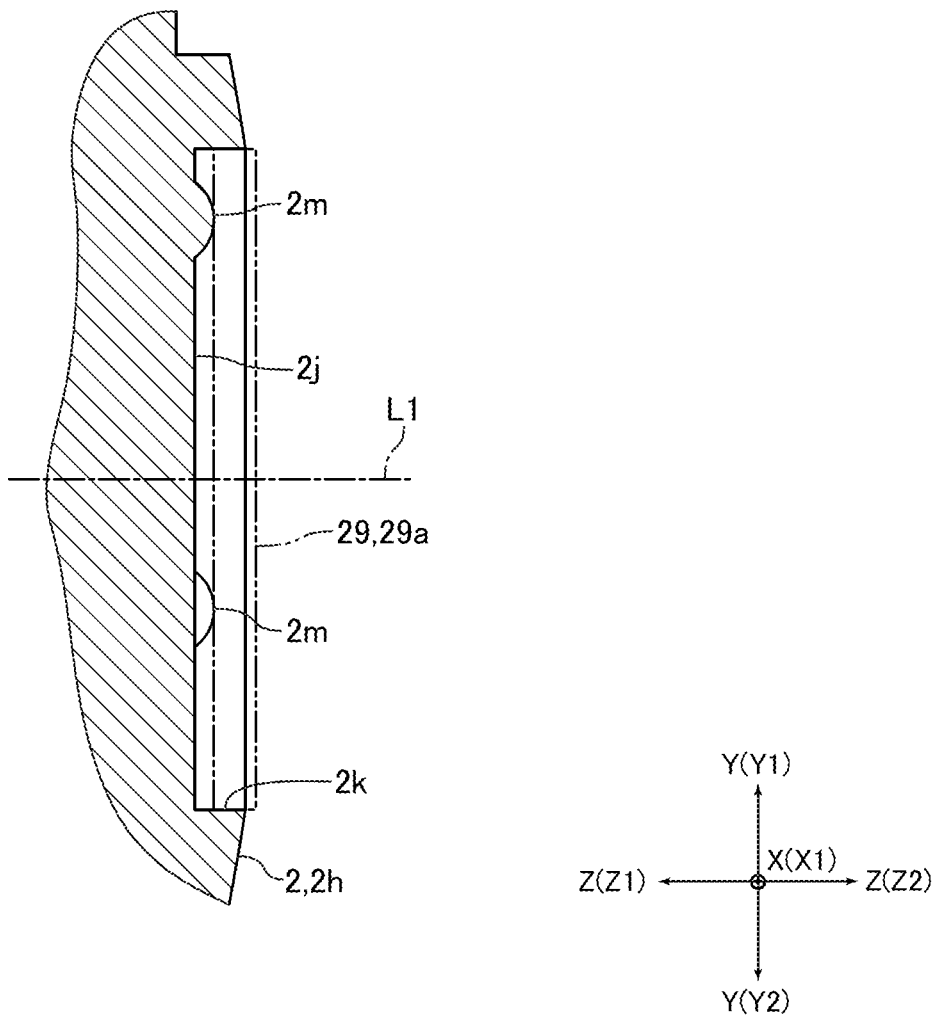
FIG. 8 is an enlarged view of a portion F in FIG. 5.

FIG. 3 is an exploded perspective view of the mirror holding mechanism 1 illustrated in FIG. 1. FIG. 4 is an exploded perspective view of the mirror holding mechanism 1 illustrated in FIG. 1 from an angle different from that in FIG. 3. FIG. 5 is a vertical cross-sectional view of the mirror holding mechanism 1 illustrated in FIG. 1. FIG. 6 is a horizontal cross-sectional view of the mirror holding mechanism 1 illustrated in FIG. 1. FIG. 7 is an enlarged view illustrating a flat surface 2j and its vicinity as seen from the direction E-E in FIG. 5. FIG. 8 is an enlarged view of a portion F in FIG. 5.

The mirror holding mechanism 1 includes, in addition to the reflection mirror 2 and the mirror holding frame 3 described above, two cam members 9 that are rotatably held by the mirror holding frame 3 and two shaft members 10 that are each engaged with the reflection mirror 2 on one end side and engaged with the mirror holding frame 3 and the cam member 9 on the other end side. The mirror holding mechanism 1 includes a leaf spring 11 configured to energize an upper portion of the reflection mirror 2 to the front, a compression coil spring 12 configured to energize a lower portion of the reflection mirror 2 to the rear, and a bolt 13 connecting the lower portion of the reflection mirror 2 and a lower portion of the mirror holding frame 3 to each other.

Each of the shaft member 10 is formed into a column with a flange. The shaft member 10 includes a columnar shaft portion 10a constituting one end-side part of the shaft member 10, a columnar shaft portion 10b constituting the other end-side part of the shaft member 10, and a disc-shaped flange portion 10c disposed between the shaft portion 10a and the shaft portion 10b. The length of the shaft portion 10a is shorter than the length of the shaft portion 10b. For example, the bolt 13 is a hexagon socket head bolt, and includes a shaft portion 13a and a head portion 13b. A male thread is formed on the distal end side of the shaft portion 13a.

A front surface of the reflection mirror 2, which is a surface on which the reflection surface 2a is formed, has a concave curved shape. A rear surface 2h, which is a surface opposite to the front surface, has a convex curved shape. The reflection mirror 2 is formed into a substantially curved plate. Specifically, the concave curved reflection surface 2a is formed on the reflection mirror 2. In the present embodiment, the reflection mirror 2 is disposed such that the front surface is a front surface of the reflection mirror 2 and the rear surface 2h is a back surface of the reflection mirror 2. The rear direction (Z2 direction) in the present embodiment is a second direction that is a direction from the front surface on which the reflection surface 2a is formed toward the rear surface 2h which is oriented to one side in the front-back direction as the first direction.

At the center of an upper end of the reflection mirror 2, a spring abutment portion 2b with which the leaf spring 11 comes into contact is formed so as to protrude upward. At the center of a lower end of the reflection mirror 2, a bolt engagement portion 2c with which the bolt 13 is engaged is formed so as to protrude downward. To the bolt engagement portion 2c, a through hole 2d that passes therethrough in the front-back direction is formed. The through hole 2d is formed into a circular hole. The inner diameter of the through hole 2d is larger than the outer diameter of the shaft portion 13a of the bolt 13. As illustrated in FIG. 5, a concave portion 2e in which a part of the compression coil spring 12 is disposed is formed in the front surface of the bolt engagement portion 2c. The concave portion 2e is formed so as to be recessed to the rear side from the front surface of the bolt engagement portion 2c. The concave portion 2e is formed such that the shape of an inner circumferential surface when viewed from the front-back direction is circular. The concave portion 2e is disposed coaxially with the through hole 2d.

Engagement grooves 2f to be engaged with the shaft portions 10a of the shaft member 10 are formed in both end surfaces of the reflection mirror 2 in the horizontal direction. The engagement grooves 2f are formed such that the longitudinal direction of the engagement grooves 2f matches with the front-back direction. The engagement grooves 2f are formed so as to be recessed toward the inner side in the horizontal direction. The front end side of the engagement grooves 2f is opened, and the shape of the engagement groove 2f when viewed from the horizontal direction is substantially a U-shape. The width of the engagement grooves 2f in the vertical direction is substantially equal to the outer diameter of the shaft portions 10a. A flat surface 2g orthogonal to the front-back direction is formed on either end side of the rear surface 2h of the reflection mirror 2 in the horizontal direction. In the present embodiment, the flat surface 2g is formed behind the engagement groove 2f, and the engagement groove 2f and the flat surface 2g are formed so as to overlap with each other in the front-back direction.

A flat surface 2j orthogonal to the front-back direction is formed on the rear surface 2h of the reflection mirror 2. The flat surface 2j is formed such that the shape when viewed from the front-back direction is circular. The flat surface 2j is formed on the optical axis L1 of the reflection mirror 2. Specifically, the flat surface 2j is formed such that the optical axis L1 passes the center of the flat surface 2j. On the rear surface 2h, a wall surface 2k that rises from the entire circumference of the flat surface 2j to the rear side so as to surround the entire circumference of the flat surface 2j is formed. Specifically, on the rear surface 2h, the cylindrical wall surface 2k that rises from the entire circumference of the flat surface 2j to the rear side is formed. In the present embodiment, a recessed portion the shape of which is circular when viewed from the front-back direction is formed on the rear surface 2h so as to be recessed to the front side and such that the optical axis L1 passes through the center of the recessed portion, thereby forming the flat surface 2j and the wall surface 2k. The flat surface 2j is a reflection surface configured to reflect light.

As illustrated in FIG. 7 and FIG. 8, three or more protruding portions 2m that protrude to the rear side are formed on the flat surface 2j. In the present embodiment, three protruding portions 2m are formed. The three protruding portions 2m are formed to have the same shape. The three protruding portions 2m are disposed so as to surround the center of the flat surface 2j when viewed from the front-back direction. Specifically, the three protruding portions 2m are disposed so as to surround the optical axis L1 when viewed from the front-back direction. The three protruding portions 2m are disposed at equiangular pitches about the center of the flat surface 2j when viewed from the front-back direction. Specifically, the three protruding portions 2m disposed at 120°-pitches about the center of the flat surface 2j when viewed from the front-back direction are formed on the flat surface 2j. The three protruding portions 2m are disposed concentrically about the center of the flat surface 2j when viewed from the front-back direction. The surface of the protruding portion 2m is formed into a spherical surface.

The mirror holding frame 3 is a frame-shaped member configured to hold the reflection mirror 2. The mirror holding frame 3 includes two side surface portions 3a disposed on each of the right and left sides of the reflection mirror 2 so as to sandwich the reflection mirror 2 in the horizontal direction, two portions to be fixed 3b that are placed and fixed to the fixation portion 6b of the fixation frame 6, and a coupling portion 3c and a coupling portion 3d configured to couple the two side surface portions 3a. The side surface portions 3a are formed into substantially flat plates, and are disposed such that the thickness direction of the side surface portions 3a matches with the horizontal direction. The two portions to be fixed 3b are connected to lower sides of the two side surface portions 3a, respectively. The two portions to be fixed 3b expand outward in the horizontal direction from the two side surface portions 3a, respectively. The coupling portion 3c is formed into a substantially flat plate, and is disposed such that the thickness direction of the coupling portion 3c matches with the vertical direction. The coupling portion 3c connects the two side surface portions 3a at the lower end side and the rear end side. The coupling portion 3d is formed such that the shape when viewed from the front-back direction is a substantially arc that expands downward, and connects the two side surface portions 3a at the lower end side and the front end side. The coupling portion 3d protrudes to the lower side of the side surface portions 3a.

The two side surface portions 3a sandwich an upper part of the reflection mirror 2 in the horizontal direction. A columnar support shaft 3e configured to rotatably support the cam member 9, a columnar protruding portion 3f configured to fix the cam member 9, a guide hole 3g through which the shaft portion 10b of the shaft member 10 is inserted, and a cylindrical shaft support portion 3h configured to support an adjustment jig 30 described later are formed on the side surface portion 3a. The support shaft 3e, the protruding portion 3f, and the shaft support portion 3h are formed so as to protrude from an outer surface of each of the two side surface portions 3a in the horizontal direction to the outer side in the horizontal direction. Screw holes are formed on the distal end side of the support shaft 3e and the distal end side of the protruding portion 3f. The protruding portion 3f is disposed directly above the support shaft 3e. The guide hole 3g is formed so as to pass through the side surface portion 3a. The guide hole 3g is formed into a long hole the longitudinal direction of which is the vertical direction. The width of the guide hole 3g in the front-back direction is substantially equal to the outer diameter of the shaft portion 10b. The guide hole 3g is disposed directly under the support shaft 3e. Specifically, the protruding portion 3f, the support shaft 3e, and the guide hole 3g are formed side by side in this order from the upper side in the vertical direction. The shaft support portion 3h is disposed behind the guide hole 3g.

In the portion to be fixed 3b, a through hole 3i passing therethrough in the vertical direction is formed. The portion to be fixed 3b is fixed to the fixation portion 6b with a bolt 15 inserted through the through hole 3i in the state in which the portion to be fixed 3b is placed on the fixation portion 6b of the fixation frame 6. In the portion to be fixed 3b, a screw hole 3j for adjusting the position of the mirror holding frame 3 in the horizontal direction with respect to the fixation frame 6 is formed. Specifically, the screw holes 3j are formed from both laterally outer surfaces of the two portions to be fixed 3b toward the inner side in the horizontal direction.

At the center of the upper surface of the coupling portion 3c, a spring fixation portion 3k to which the leaf spring 11 is fixed is formed so as to protrude upward. In the spring fixation portion 3k, an abutment portion 3m with which the spring abutment portion 2b of the reflection mirror 2 comes into contact from the rear side is formed (see FIG. 5). On the rear surface side of the spring fixation portion 3k, a flat spring fixation surface 3n to which the leaf spring 11 is fixed is formed. The spring fixation surface 3n is disposed behind the abutment portion 3m. On both end sides of the coupling portion 3c in the horizontal direction, columnar protruding portions 3s configured to position and fix adjustment jigs 31 described later are formed so as to protrude upward. Screw holes are formed on the distal end side of the protruding portions 3s.

On the lower end side of the coupling portion 3d, a screw hole 3p with which a male thread of the bolt 13 is engaged and a concave portion 3r in which a part of the compression coil spring 12 is disposed are formed. The concave portion 3r is formed so as to be recessed from the rear surface of the coupling portion 3d to the front side. The concave portion 3r is formed such that the shape of an inner circumferential surface when viewed from the front-back direction is circular. The screw hole 3p is formed on the front side of the concave portion 3r. The screw hole 3p is disposed coaxially with the concave portion 3r.

The cam member 9 is formed into a substantially disc shape. At the center of the cam member 9, an insertion hole 9a through which the support shaft 3e of the mirror holding frame 3 is inserted is formed. The insertion hole 9a is formed so as to pass through the cam member 9. A gear 9b is formed on the outer circumferential surface of the cam member 9. The gear 9b is formed over the entire outer circumferential surface of the cam member 9. On one surface of the cam member 9, a cam groove 9c to which a distal end part of the shaft portion 10b of the shaft member 10 is engaged and a relief groove 9d for preventing interference between the rotating cam member 9 and the protruding portion 3f of the mirror holding frame 3 are formed. The cam groove 9c and the relief groove 9d are disposed so as to be recessed from one surface of the cam member 9 toward the other surface.

The cam groove 9c is formed into a substantially semi-circular-arc shape. The outer surface of the cam groove 9c in the radial direction of the cam member 9 is a cam surface 9e with which the distal end part of the shaft portion 10b comes into contact. The cam surface 9e is formed into a curved surface in which the distance between the center of the cam member 9 and the cam surface 9e continuously changes in the circumferential direction of the cam member 9. The relief groove 9d is formed into a substantially semi-circular-arc shape. The relief groove 9d is formed in a region in which the cam groove 9c is not formed. In the range in which the relief groove 9d is formed, an arc-shaped through hole 9f passing through the cam member 9 is formed.

The cam member 9 is disposed on the outer side of the side surface portion 3a in the horizontal direction. Specifically, the two cam members 9 are disposed on both outer sides of the two side surface portions 3a, respectively, in the horizontal direction. The cam member 9 is disposed such that the surface in which the cam groove 9c and the relief groove 9d are formed faces inward in the horizontal direction. The cam member 9 is rotatably held by the side surface portion 3a. Specifically, the cam member 9 is mounted to the side surface portion 3a with a bolt 17 that is engaged with a screw hole in the support shaft 3e from the outer side of the cam member 9 in the horizontal direction in the state in which the support shaft 3e of the side surface portion 3a is inserted to the insertion hole 9a. The cam member 9 is rotatably supported by the support shaft 3e, and rotates about the horizontal direction as an axial direction of the rotation. In the state in which the cam member 9 is held by the side surface portion 3a, the protruding portion 3f of the side surface portion 3a is disposed inside the relief groove 9d. A bolt 18 is inserted to the through hole 9f from the outer side of the cam member 9 in the horizontal direction. The distal end side of the bolt 18 is engaged with a screw hole in the protruding portion 3f. The bolt 18 serves to fix the cam member 9 to the side surface portion 3a.

As described above, the reflection mirror 2 is disposed between the two side surface portions 3a. In this state, as illustrated in FIG. 6, the shaft portion 10a of the shaft member 10 is engaged with the engagement groove 2f in the reflection mirror 2. The shaft portion 10b is inserted to the guide hole 3g. A distal end part of the shaft portion 10b is engaged with the cam groove 9c and in contact with the cam surface 9e. Thus, when the cam member 9 rotates, the shaft member 10 continuously moves in the vertical direction along the guide hole 3g, and the right end side and/or the left end side of the reflection mirror 2 continuously moves in the vertical direction together with the shaft member 10. The shaft portion 10b is inserted to the guide hole 3g, and a distal end part of the shaft portion 10b is engaged with the cam groove 9c. The shaft portion 10b protrudes from the reflection mirror 2 to the outer side in the horizontal direction. Specifically, the two shaft portions 10b protrude from the reflection mirror 2 to both outer sides in the horizontal direction, respectively. A wave washer 21 is disposed between the flange portion 10c of the shaft member 10 disposed on the right side and the side surface portion 3a disposed on the right side. The shaft portion 10b is inserted in the inner circumferential side of the wave washer 21. The wave washer 21 energizes the reflection mirror 2 and the two shaft members 10 toward the side surface portion 3a disposed on the left side.

In the state in which the reflection mirror 2 is disposed between the two side surface portions 3a, the spring abutment portion 2b of the reflection mirror 2 is disposed behind the abutment portion 3m of the spring fixation portion 3k of the mirror holding frame 3. In this state, the bolt engagement portion 2c of the reflection mirror 2 is disposed behind a lower end part of the coupling portion 3d of the mirror holding frame 3. The leaf spring 11 is fixed to the spring fixation surface 3n of the spring fixation portion 3k with bolts 22. The leaf spring 11 energizes the spring abutment portion 2b such that the spring abutment portion 2b abuts on the abutment portion 3m from the rear side.

As illustrated in FIG. 5, the front end side of the compression coil spring 12 is disposed inside the concave portion 3r of the mirror holding frame 3, and the rear end side of the compression coil spring 12 is disposed inside the concave portion 2e of the reflection mirror 2. The head portion 13b of the bolt 13 is disposed behind the bolt engagement portion 2c. The shaft portion 13a is inserted in the through hole 2d and the inner circumferential side of the compression coil spring 12. The male thread formed on the shaft portion 13a is engaged with the screw hole 3p in the coupling portion 3d. The compression coil spring 12 energizes the bolt engagement portion 2c such that the bolt engagement portion 2c and a lower part of the coupling portion 3d are separated away from each other and the bolt engagement portion 2c contacts with the head portion 13b. Thus, the lower part of the reflection mirror 2 is held by the lower part of the mirror holding frame 3 so as not to move with respect to the lower part of the mirror holding frame 3.

Figure 9:
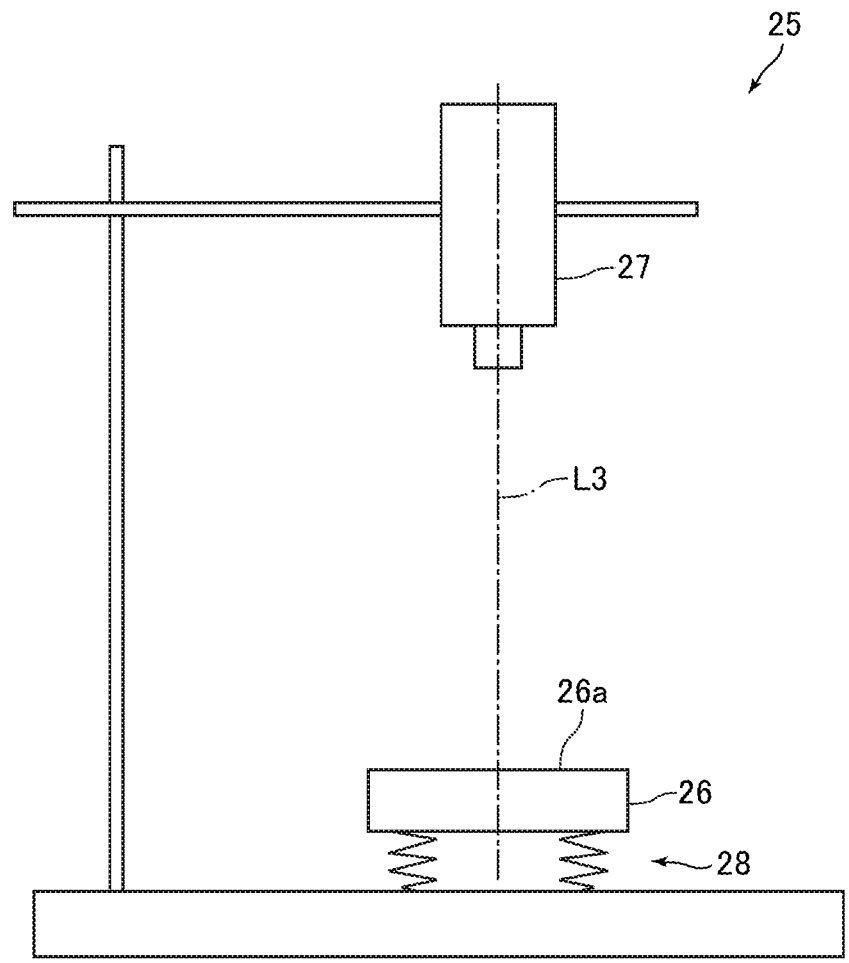
FIG. 9 is a schematic diagram of a collimator used to adjust a relative position between a lens barrel and the reflection mirror in the projection optical system illustrated in FIG. 1.

Method for Adjusting Relative Position Between Lens Barrel and Reflection Mirror FIG. 9 is a schematic diagram of a collimator 25 used to adjust the relative position between the lens barrel 5 and the reflection mirror 2 in the projection optical system 4 illustrated in FIG. 1. FIG. 10 is a perspective view for describing a state in which the reflection mirror 2 is adjusted in the projection optical system 4 illustrated in FIG. 1.

In the projection optical system 4, for example, at the time of assembling of the projection optical system 4 in a manufacturing factory, a collimator 25 is used to adjust the relative position between the lens barrel 5 and the reflection mirror 2. As illustrated in FIG. 9, the collimator 25 includes a stage 26 on which the projection optical system 4 is to be placed, a collimator unit 27 configured to emit adjustment light toward the stage 26 and measure reflected light, and an adjustment unit 28 configured to adjust the position and angle between the stage 26 and the collimator unit 27. For adjusting the relative position between the lens barrel 5 and the reflection mirror 2, first, the collimator 25 is adjusted by the adjustment unit 28 such that an optical axis L3 of the collimator unit 27 and a mounting surface 26a of the stage 26 are orthogonal to each other.

After that, the projection optical system 4 is placed on the mounting surface 26a of the stage 26. Specifically, the projection optical system 4 is placed on the mounting surface 26a such that the optical axis L2 of the imaging optical system disposed on the inner circumferential side of the lens barrel 5 is parallel to the optical axis L3 of the collimator unit 27. The projection optical system 4 is placed on the mounting surface 26a such that the rear side (Z2 direction side) of the projection optical system 4 faces the collimator unit 27 and the front side (Z1 direction side) of the projection optical system 4 faces the stage 26. After that, the collimator 25 is adjusted by the adjustment unit 28 such that the optical axis L3 passes the flat surface 2j of the reflection mirror 2.

After that, an adjustment mirror 29 (see FIG. 8) formed into a disc is placed on the protruding portion 2m of the reflection mirror 2, and adjustment light is emitted from the collimator unit 27 to the adjustment mirror 29. The angle of the reflection mirror 2 is adjusted such that the reflection surface 29a of the adjustment mirror 29 and the optical axis L3 are orthogonal to each other while checking light reflected by the adjustment mirror 29. Specifically, the screwed amounts of the bolt 13 in the screw hole 3p of the mirror holding frame 3 is adjusted to adjust the angle of the reflection mirror 2 about the horizontal direction as an axial direction of the rotation.

The flat surfaces 2g of the reflection mirror 2 are pushed to adjust the angle of the reflection mirror 2 about the vertical direction as an axial direction of the rotation. In the present embodiment, the adjustment jig 31 is used to adjust the angle of the reflection mirror 2 about the vertical direction as an axial direction of the rotation. The adjustment jig 31 includes a jig main body portion 32, two fixation bolts 33 configured to fix the jig main body portion 32 to the mirror holding frame 3, and two adjustment bolts 34 configured to adjust the angle of the reflection mirror 2. The fixation bolt 33 includes a grip portion 33a and a shaft portion (not shown) protruding from the grip portion 33a. The shaft portion has a male thread formed thereon. The adjustment bolt 34 includes a grip portion 34a and a shaft portion 34b protruding from the grip portion 34a. The shaft portion 34b has a male thread formed thereon. The distal end of the shaft portion 34b has a flat surface (see FIG. 6).

The jig main body portion 32 includes a plate-shaped portion to be fixed 32a that is placed and fixed on the coupling portion 3c of the mirror holding frame 3, and two bolt holding portions 32b configured to hold the adjustment bolts 34. Through holes (not shown) through which the shaft portions of the fixation bolts 33 are inserted are formed on both lateral end sides of the portion to be fixed 32a. The bolt holding portions 32b are formed into flat plates orthogonal to the front-back direction. The two bolt holding portions 32b are connected to both lateral end sides of the portion to be fixed 32a, respectively. The two bolt holding portions 32b are formed so as to be bent at a right angle from both lateral end sides of the portion to be fixed 32a, respectively. Screw holes 32c with which the male threads of the shaft portions 34b of the adjustment bolts 34 are engaged are formed in the bolt holding portions 32b (see FIG. 6).

The adjustment jig 31 is mounted to the mirror holding frame 3 in a manner that the portion to be fixed 32a is placed on the coupling portion 3c and the male threads of the fixation bolts 33 are threaded into the screw holes in the protruding portions 3s. The distal ends of the shaft portions 34b of the two adjustment bolts 34 mounted to the jig main body portion 32 are disposed at positions that allow contact to the two flat surfaces 2g of the reflection mirror 2 from the rear side, respectively. The screwed amounts of the adjustment bolts 34 in the screw holes 32c are adjusted to adjust the pushed amounts of the two flat surfaces 2g, thereby adjusting the angle of the reflection mirror 2 about the vertical direction as an axial direction of the rotation. After the adjustment of the angle of the reflection mirror 2 about the vertical direction as an axial direction of the rotation is finished, the adjustment jig 31 is removed from the mirror holding frame 3.

In the present embodiment, in the state in which the bolt 15 is loosened, an adjustment bolt (not shown) is engaged with the screw hole 3j in the mirror holding frame 3 from the outer side in the horizontal direction such that the distal end of the adjustment bolt contacts with the fixation frame 6, and the screwed amount of the adjustment bolt in the screw hole 3j is adjusted to adjust the mounting position of the mirror holding frame 3 in the horizontal direction with respect to the fixation frame 6, thereby adjusting the position of the reflection mirror 2 in the horizontal direction. In the state in which the bolts 18 are loosened, the two cam members 9 are rotated to raise or lower both lateral sides of the reflection mirror 2 with respect to the mirror holding frame 3, thereby adjusting the position of the reflection mirror 2 in the vertical direction and the angle of the reflection mirror 2 about the front-back direction as an axial direction of the rotation.

In the present embodiment, the adjustment jigs 30 are used to adjust the position of the reflection mirror 2 in the vertical direction and the angle of the reflection mirror 2 about the front-back direction as an axial direction of the rotation. The adjustment jig 30 includes a grip portion 30a formed into a circular column, a gear portion 30c on which a jig-side gear 30b to be engaged with the gear 9b of the cam member 9 is formed on its outer circumferential surface, and a columnar rotation center shaft portion 30d rotatably supported by the shaft support portion 3h of the side surface portion 3a. For adjusting the position of the reflection mirror 2 in the vertical direction and the angle of the reflection mirror 2 about the front-back direction as an axial direction of the rotation, the rotation center shaft portion 30d is inserted in the shaft support portion 3h such that the gear 9b and the jig-side gear 30b are engaged with each other, and then the adjustment jig 30 is rotated while gripping the grip portion 30a. When the adjustment jig 30 rotates, the cam member 9 also rotates together with the adjustment jig 30, and the position of the reflection mirror 2 in the vertical direction or the angle of the reflection mirror 2 about the front-back direction as an axial direction of the rotation is adjusted. After the adjustment is finished, the adjustment jig 30 is removed.

Main Effects in the Present Embodiment

As described above, in the present embodiment, the rear surface 2h of the reflection mirror 2 has the flat surface 2j orthogonal to the front-back direction and the wall surface 2k that rises from the entire circumference of the flat surface 2j to the rear side so as to surround the entire circumference of the flat surface 2j. Thus, in the present embodiment, in the case of adjusting the relative position between the lens barrel 5 and the reflection mirror 2 in the projection optical system 4, even when the adjustment mirror 29 is disposed on the flat surface 2j of the reflection mirror 2, a deviation of the adjustment mirror 29 disposed on the flat surface 2j can be prevented by the wall surface 2k to dispose the adjustment mirror 29 at a given position. Consequently, in the present embodiment, the angle of the reflection mirror 2 can be appropriately adjusted while checking light reflected by the adjustment mirror 29 as described above. In other words, in the present embodiment, the angle of the reflection mirror 2 can be appropriately adjusted without using light reflected by the flat surface 2j of the reflection mirror 2. Consequently, in the present embodiment, the relative position between the lens barrel 5 and the reflection mirror 2 can be appropriately adjusted without the need of manufacturing the reflection mirror 2 such that the surface accuracy of the flat surface 2j is high and the reflectivity of the flat surface 2j is high. As a result, in the present embodiment, the manufacturing cost of the reflection mirror 2 can be reduced while the relative position between the lens barrel 5 and the reflection mirror 2 can be appropriately adjusted.

In the present embodiment, the wall surface 2k rises from the entire circumference of the flat surface 2j to the rear side so as to surround the entire circumference of the flat surface 2j, and hence a deviation of the adjustment mirror 29 disposed on the flat surface 2j can be reliably prevented. In the present embodiment, the recessed portion that is recessed to the front side is formed on the rear surface 2h of the reflection mirror 2, so that the flat surface 2j and the wall surface 2k can be formed on the rear surface 2h. Thus, the flat surface 2j and the wall surface 2k can be easily formed. In the present embodiment, the flat surface 2j is formed on the optical axis L1 of the reflection mirror 2, and hence as compared with the case where the flat surface 2j is formed at a position shifted from the optical axis L1, the recessed portion can be more easily formed on the rear surface 2h of the reflection mirror 2 formed into a substantially curved plate.

In the present embodiment, three protruding portions 2m that protrude to the rear side are formed on the flat surface 2j, and when the relative position between the lens barrel 5 and the reflection mirror 2 is to be adjusted, the adjustment mirror 29 is placed on the three protruding portions 2m. Specifically, in the present embodiment, when the relative position between the lens barrel 5 and the reflection mirror 2 is to be adjusted, the adjustment mirror 29 is supported by the three protruding portions 2m at three points. Thus, in the present embodiment, the adjustment mirror 29 can be disposed on the flat surface 2j such that the reflection surface 29a of the adjustment mirror 29 is orthogonal to the front-back direction (that is, orthogonal to the optical axis L1 of the reflection mirror 2). In other words, the adjustment mirror 29 can be precisely disposed on the flat surface 2j, and as a result, the relative position between the lens barrel 5 and the reflection mirror 2 can be precisely adjusted.

Other Embodiments

In the above-mentioned embodiment, the flat surface 2j is formed such that the optical axis L1 passes the center of the flat surface 2j, but the flat surface 2j may be formed such that the optical axis L1 passes a position shifted from the center of the flat surface 2j. In this case, the flat surface 2j may be formed at a position shifted from the optical axis L1. Specifically, the flat surface 2j may be formed at a position not intersecting with the optical axis L1. In the above-mentioned embodiment, the wall surface 2k is formed so as to rise from the entire circumference of the flat surface 2j to the rear side so as to surround the entire circumference of the flat surface 2j, but the wall surface 2k may be formed so as to rise from a part of the region around the flat surface 2j to the rear side. In this case, for example, the inner surface of a wall portion that rises from the rear surface 2h to the rear side serves as the wall surface 2k, and a recessed portion for forming the wall surface 2k is not formed on the rear surface 2h.

In the above-mentioned embodiment, the three protruding portions 2m are disposed at equiangular pitches about the center of the flat surface 2j when viewed from the front-back direction, but the three protruding portions 2m are not necessarily required to be disposed at equiangular pitches about the center of the flat surface 2j. In the above-mentioned embodiment, the three protruding portions 2m are disposed concentrically about the center of the flat surface 2j when viewed from the front-back direction, but the three protruding portions 2m are not necessarily required to be disposed concentrically about the center of the flat surface 2j. In addition, in the above-mentioned embodiment, the three protruding portions 2m are formed on the flat surface 2j, but the number of the protruding portions 2m formed on the flat surface 2j may be four or more.

In the above-mentioned embodiment, the protruding portion 2m is a protrusion having a spherical surface shape, but the protruding portion 2m may be a protrusion formed into a cone, a circular truncated cone, a column, a polygonal pyramid, a polygonal frustum, or a polygonal prism. The protruding portion 2m may be formed into a flat plate or a curved plate having a U-shape, for example. In this case, the number of the protruding portions 2m may be two or one as long as the adjustment mirror 29 placed on the protruding portion 2m is stable. In the above-mentioned embodiment, the flat surface 2j is formed such that the shape viewed from the front-back direction is circular, but the flat surface 2j may be formed such that the shape viewed from the front-back direction is another shape such as an ellipse and a polygon. In this case, the adjustment mirror 29 is formed into an elliptical plate or a polygonal plate in accordance with the shape of the flat surface 2j.

In the above-mentioned embodiment, the adjustment mirror 29 is disposed on the flat surface 2j in order to adjust the relative position between the lens barrel 5 and the reflection mirror 2, but the adjustment mirror 29 is not necessarily required to be disposed on the flat surface 2j in order to adjust the relative position between the lens barrel 5 and the reflection mirror 2 as along as the surface accuracy of the flat surface 2j and the reflectivity of the flat surface 2j are secured. In this case, adjustment light is emitted from the collimator unit 27 to the flat surface 2j, and the angle of the reflection mirror 2 is adjusted such that the flat surface 2j and the optical axis L3 are orthogonal to each other while checking light reflected by the flat surface 2j.

The entire disclosure of Japanese Patent Application No. 2015-184632, filed on Sep. 18, 2015 is expressly incorporated by reference herein.

The invention claimed is:

1. A reflection mirror having a concave curved reflection surface, wherein
when a surface on which the reflection surface is formed is a front surface, a surface opposite to the front surface is a rear surface, a direction parallel to an optical axis of the reflection mirror from the rear surface toward the front surface is a first direction, and a direction parallel to the optical axis from the front surface toward the rear surface is a second direction,
the rear surface has a recessed flat surface orthogonal to the first direction and a wall surface that rises from at least a part of a periphery of the flat surface toward the second direction,
the flat surface has three or more protruding portions that protrude in the second direction, the three or more protruding portions being located inboard of the wall surface, and
when viewed from the first direction, the three or more protruding portions are disposed so as to surround a center of the flat surface.

2. The reflection mirror according to claim 1, wherein the wall surface rises from an entire circumference of the flat surface toward the second direction so as to surround the entire circumference of the flat surface.

3. The reflection mirror according to claim 2, wherein the flat surface is formed on the optical axis of the reflection mirror.

4. A mirror holding mechanism, comprising:
the reflection mirror according to claim 3; and
a mirror holding member holding the reflection mirror.

5. A mirror holding mechanism, comprising:
the reflection mirror according to claim 2; and
a mirror holding member holding the reflection mirror.

6. The reflection mirror according to claim 1, wherein when viewed from the first direction, the three or more protruding portions are disposed at equiangular pitches about a center of the flat surface.

7. A mirror holding mechanism, comprising:
the reflection mirror according to claim 1; and
a mirror holding member holding the reflection mirror.

* * * * *